No. 754,845. PATENTED MAR. 15, 1904.
J. C. BURKE.
ASTRONOMICAL CLOCK.
APPLICATION FILED MAY 7, 1903.
NO MODEL. 9 SHEETS—SHEET 1.

WITNESSES:
Wm. J. Berth.
Herbert D. Lawson.

INVENTOR
John C. Burke,
By Victor J. Evans
Attorney

No. 754,845. PATENTED MAR. 15, 1904.
J. C. BURKE.
ASTRONOMICAL CLOCK.
APPLICATION FILED MAY 7, 1903.
NO MODEL. 9 SHEETS—SHEET 2.
Fig. 2.
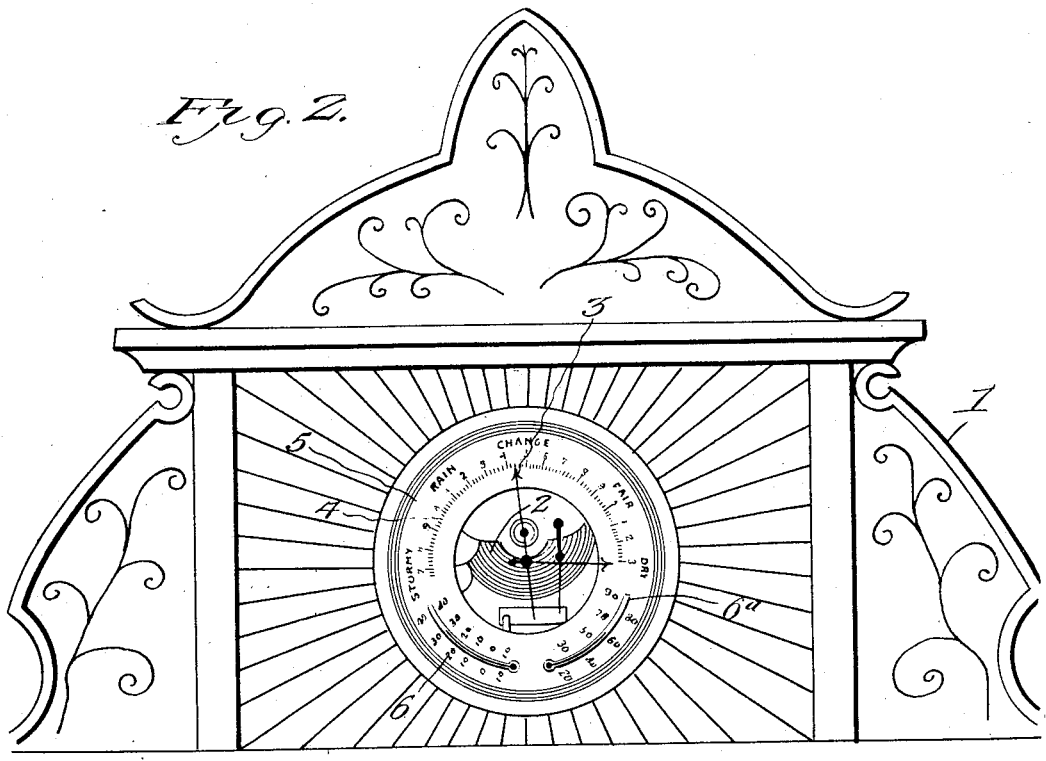
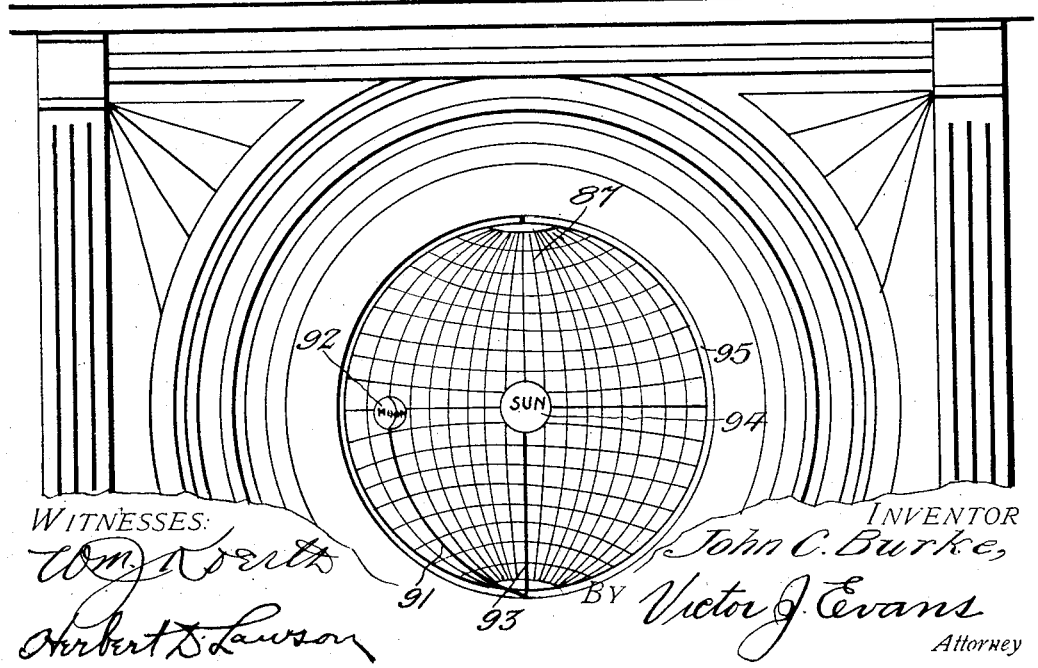
WITNESSES:
INVENTOR
John C. Burke,
BY Victor J. Evans
Attorney No. 754,845. PATENTED MAR. 15, 1904.
J. C. BURKE.
ASTRONOMICAL CLOCK.
APPLICATION FILED MAY 7, 1903.
NO MODEL. 9 SHEETS—SHEET 3.

WITNESSES: INVENTOR
John C. Burke,
BY Victor J. Evans
Attorney

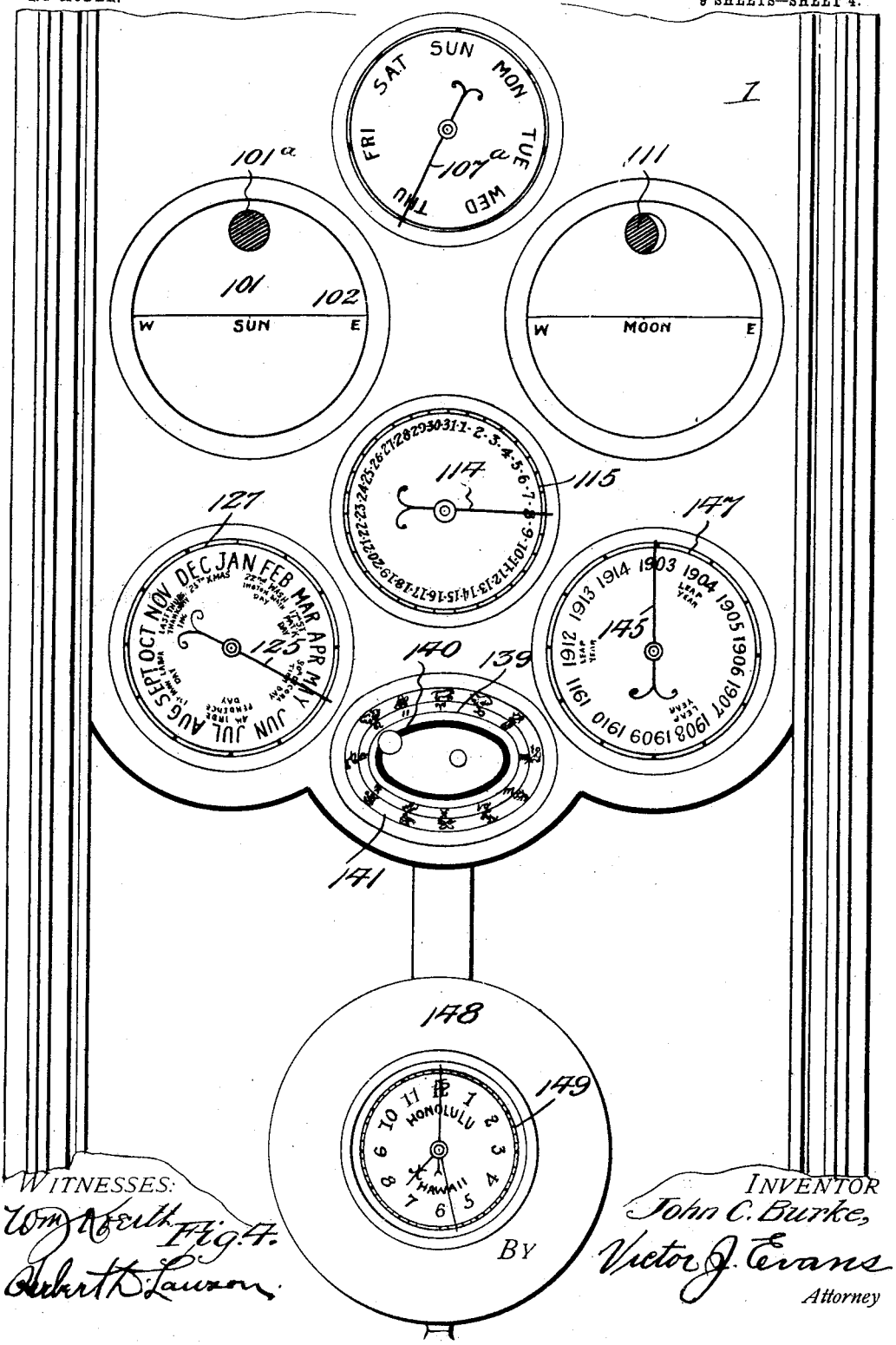

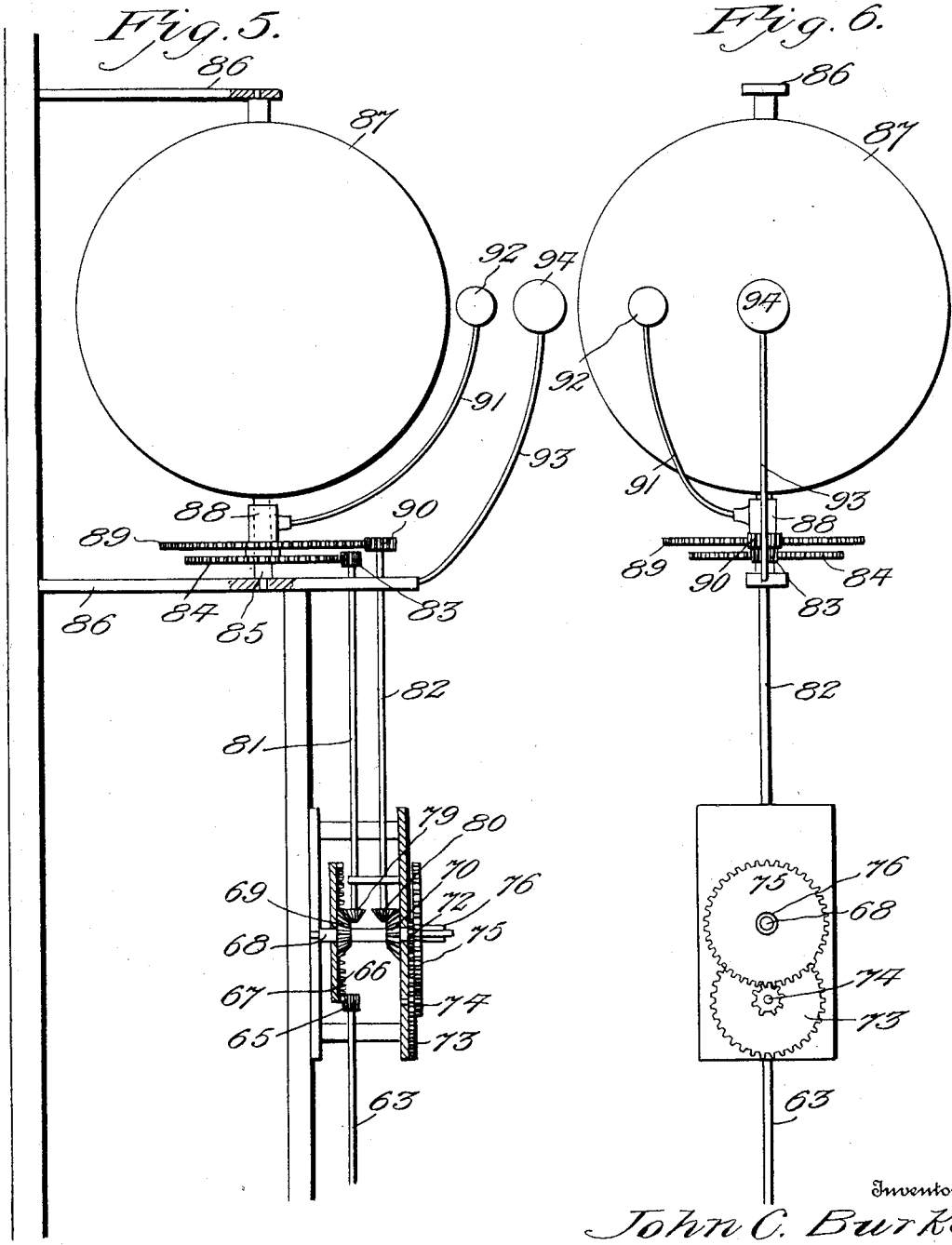

No. 754,845. PATENTED MAR. 15, 1904.
J. C. BURKE.
ASTRONOMICAL CLOCK.
APPLICATION FILED MAY 7, 1903.
NO MODEL. 9 SHEETS—SHEET 6.
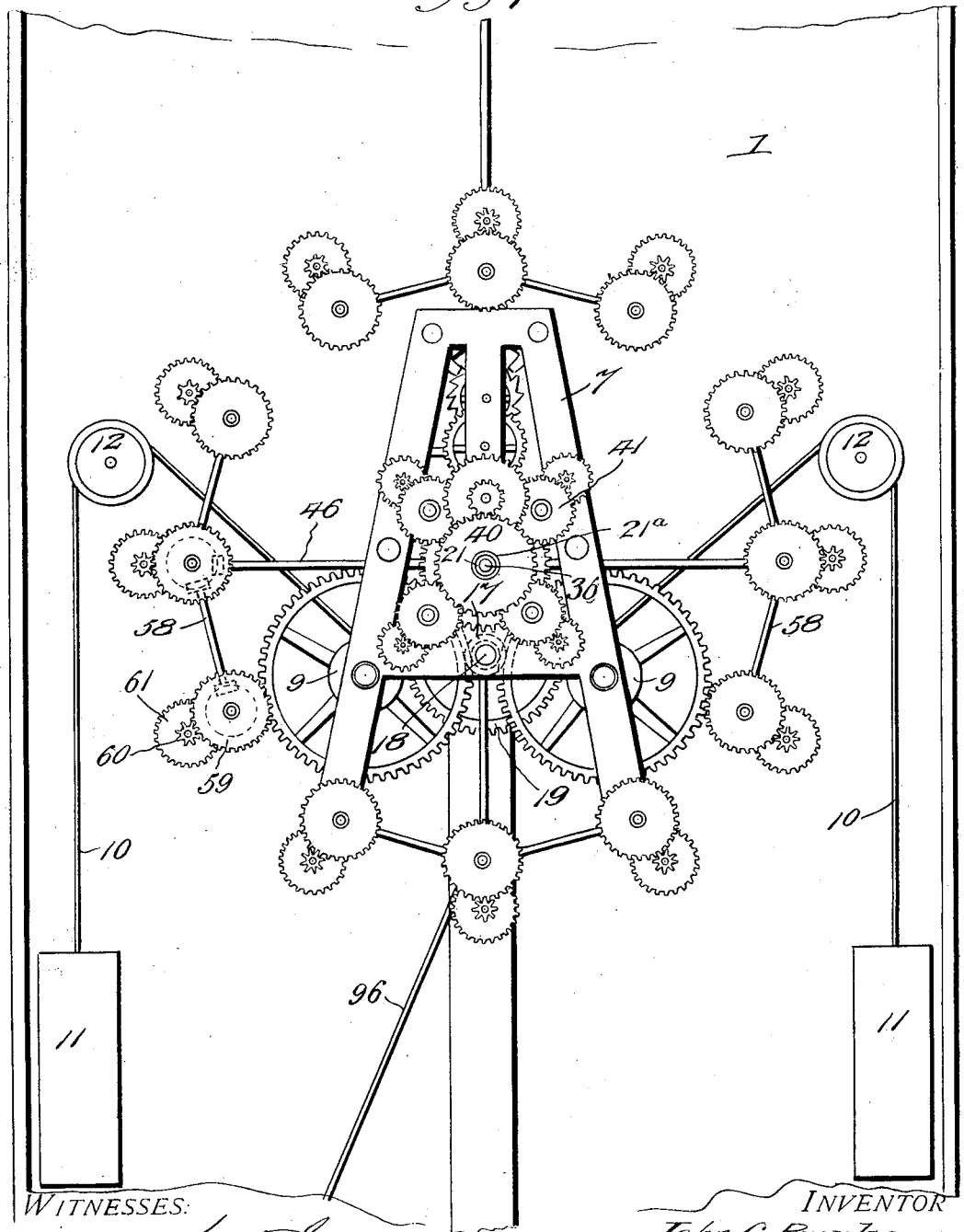

No. 754,845. PATENTED MAR. 15, 1904.
J. C. BURKE.
ASTRONOMICAL CLOCK.
APPLICATION FILED MAY 7, 1903.
NO MODEL. 9 SHEETS—SHEET 7.
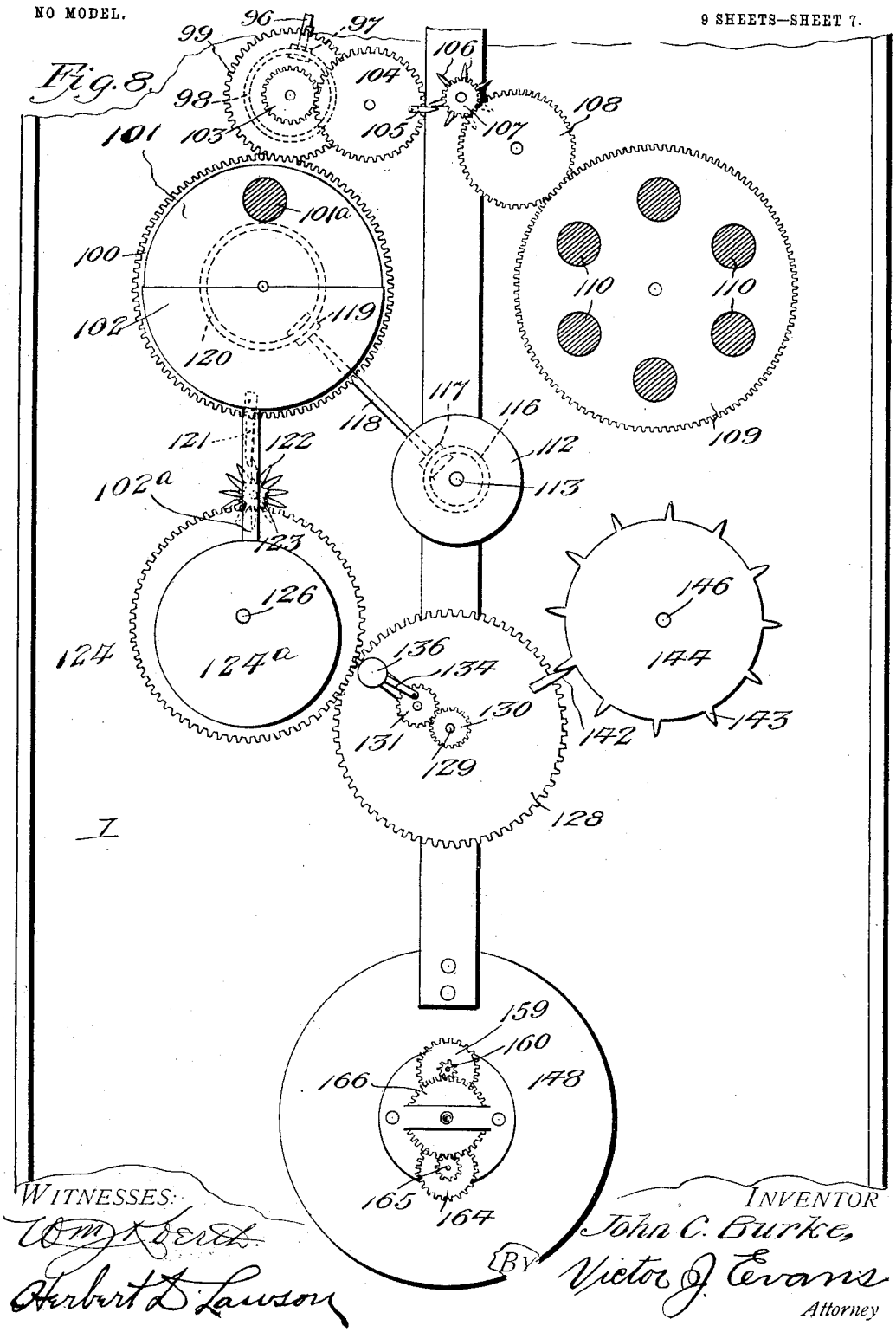
WITNESSES:
INVENTOR
John C. Burke,
By Victor J. Evans
Attorney No. 754,845. PATENTED MAR. 15, 1904.
J. C. BURKE.
ASTRONOMICAL CLOCK.
APPLICATION FILED MAY 7, 1903.
NO MODEL. 9 SHEETS—SHEET 8.
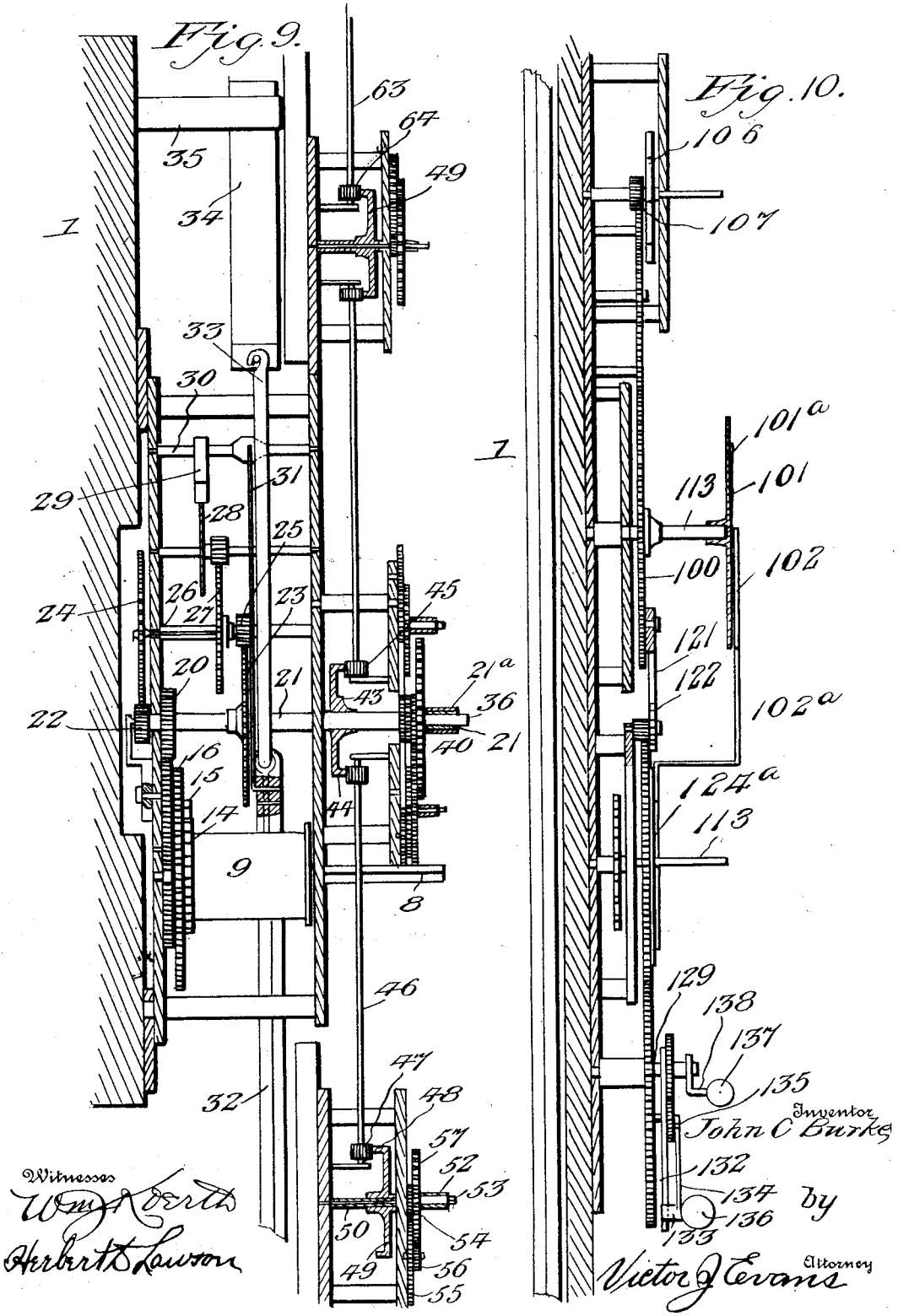

No. 754,845. PATENTED MAR. 15, 1904.
J. C. BURKE.
ASTRONOMICAL CLOCK.
APPLICATION FILED MAY 7, 1903.
NO MODEL. 9 SHEETS—SHEET 9.

WITNESSES:

INVENTOR
John C Burke,
BY Victor J Evans
Attorney

No. 754,845.                                              Patented March 15, 1904.

UNITED STATES PATENT OFFICE.

JOHN C. BURKE, OF MIDDLESBORO, KENTUCKY.

ASTRONOMICAL CLOCK.

SPECIFICATION forming part of Letters Patent No. 754,845, dated March 15, 1904.

Application filed May 7, 1903. Serial No. 156,007. (No model.)

*To all whom it may concern:*

Be it known that I, JOHN C. BURKE, a citizen of the United States, residing at Middlesboro, in the county of Bell and State of Kentucky, have invented new and useful Improvements in Astronomical Clocks, of which the following is a specification.

My invention relates to new and useful improvements in astronomical clocks; and its object is to provide an apparatus for automatically indicating the relative positions of the sun and earth on each day of the year, the relative positions of the earth, sun, and moon, the time at various places upon the earth, the name and number of the day, month, and year, the phases of the moon, and the position of the sun when above the horizon.

Another object of the invention is to provide mechanism for operating the various parts of the apparatus from a common source of power.

With the above and other objects in view the invention consists in the novel construction and combination of parts hereinafter more fully described and claimed, and illustrated in the accompanying drawings, showing the preferred form of my invention, and in which—

Figure 1:
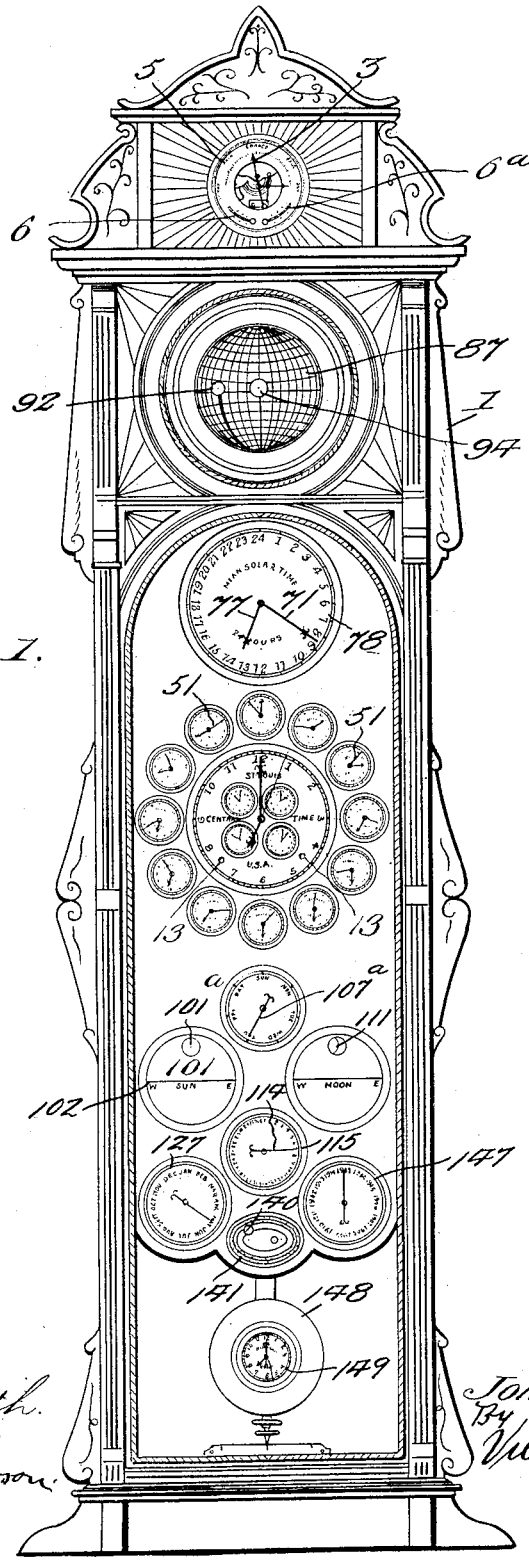
Figure 3:
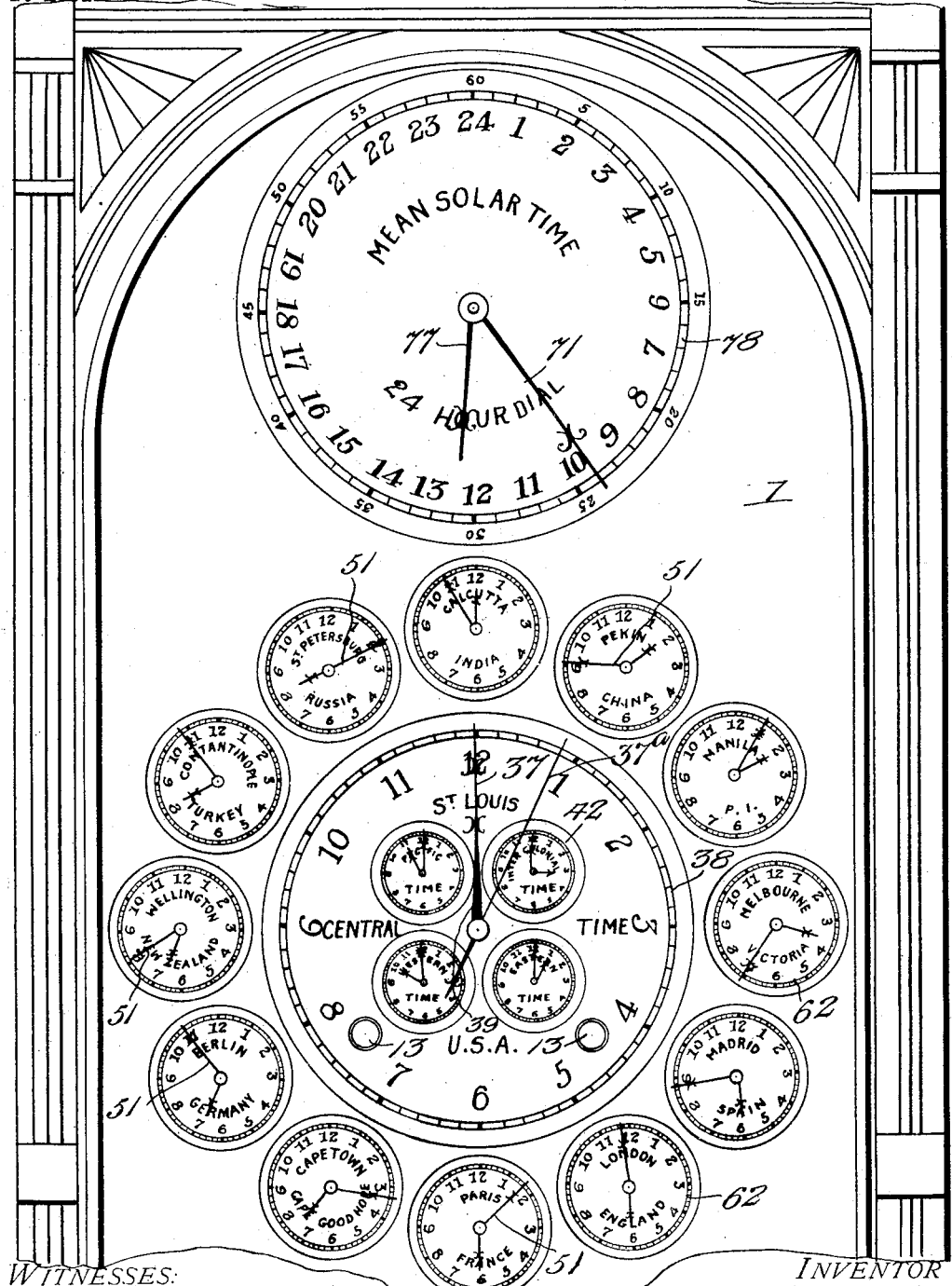
Figure 11:
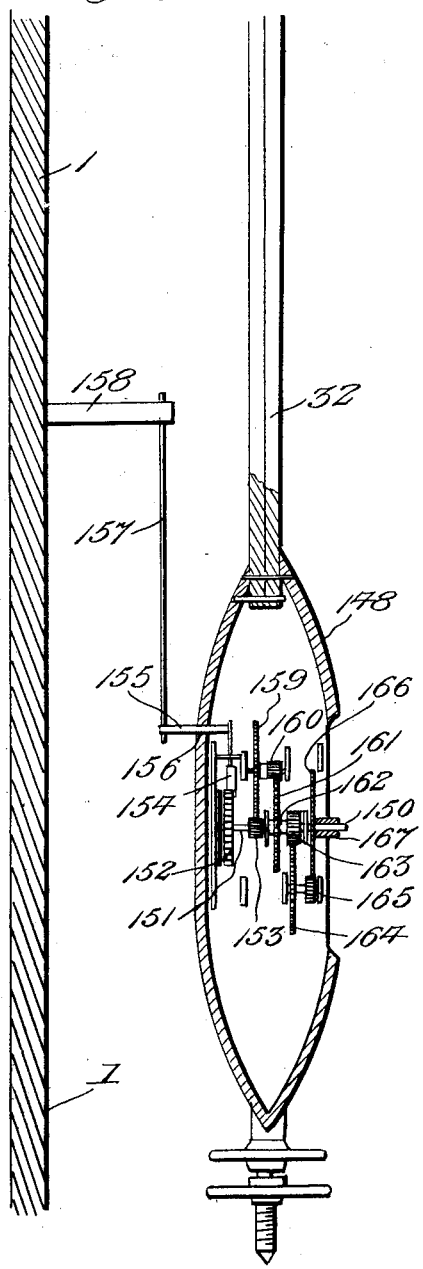
Figure 12:
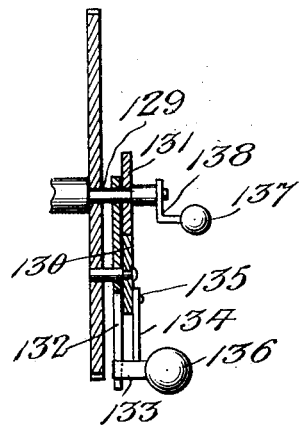

Figure 1 is a front elevation of a clock constructed in accordance with my invention. Fig. 2 is an enlarged elevation of the upper portion of the clock and showing the barometer, thermometers, and tellurian used in connection therewith. Fig. 3 is an enlarged elevation of the central portion of the clock and showing the dials and hands for indicating the mean solar time and the time at various points from the earth. Fig. 4 is an elevation of the lower portion of the clock, showing the apparatus for indicating the name and number of the day, month, and year, the position of the sun above the horizon, the phases of the moon, and the relative positions of the earth and sun. Fig. 5 is a side elevation of the tellurian and its operating mechanism. Fig. 6 is a front elevation thereof. Fig. 7 is a front elevation of the power and the mechanism for transmitting motion therefrom to the various time-indicators. Fig. 8 is a front elevation of mechanism for operating the devices disclosed in Fig. 4. Fig. 9 is a vertical transverse section through the mechanism disclosed in Fig. 7. Fig. 10 is a similar section through the mechanism disclosed in Fig. 8. Fig. 11 is a vertical transverse section through the pendulum. Fig. 12 is a detail view of the sun and earth spheres and the mechanism for moving the earth-sphere in an orbit about the sun-sphere.

Referring to the figures by numerals of reference, 1 is a clock-casing, which may be of any suitable form and material and within the upper portion of the front face of which is preferably located an aneroid barometer 2, the index 3 of which is adapted to indicate any one of a series of graduations 4, arranged on a dial 5. A centigrade thermometer 6 and a Fahrenheit thermometer 6ª may be arranged upon dial 5 at opposite sides thereof.

A preferably A-shaped frame 7 is located within the casing at a point adjacent to the center thereof, and journaled within opposite sides of this frame are spindles 8, each of which has a drum 9 secured thereto, upon which is wound a flexible strip 10, having a weight 11 at its free end. These weights are held at the sides of the casing by pulleys 12, which are journaled adjacent to said sides and support the strips 10. The forward portions of the stems 8 are angular in cross-section and are adapted to project through apertures 13 in the front of the casing to permit the same to be readily engaged by a suitable winding-key. A ratchet-wheel 14 is secured to each drum 9 and is adapted to be engaged by a pawl 15, arranged upon one face of a gear 16, secured to each spindle 8. The gears 16 of the two drums 9 mesh with a centrally-arranged small gear 17, (see Fig. 7,) which is secured to an arbor 18, upon which is arranged a gear 19. This gear meshes with a smaller gear 20, arranged on the central arbor 21 of the mechanism. A small gear 22 and a large gear 23 upon this arbor mesh with a large gear 24 and a small gear 25, respectively, located on an arbor 26, having a gear 27, which serves to drive an escapement-wheel 28. A verge 29 is arranged upon a rock-arbor 30, connected by means of a rod 31 with a pendulum-arm 32, which is suspended from a link 33, detachably secured to a spring-strip 34, which is held suspended within the casing by means of an arm 35.

The central arbor 21 is hollow, and arranged therein is a spindle 36, upon which the gear 22, before referred to, is mounted. To the forward end of this spindle is secured a sweep seconds-hand $37^a$ of a central time-dial 38. The hour-hand 39 and the minute-hand 37 upon this dial are connected to the forward end of the arbor 21 and a sleeve $21^a$ thereon. By a novel arrangement of gears 40 upon the forward end of arbor 21 motion is transmitted from said arbor to gears 41, arranged therearound and preferably in four sets, each set being located in rear of a dial 42 and the four dials being adapted to indicate "Pacific," "Western," "Eastern," and "Intercolonial" time. The large dial 38, before referred to, may be used for indicating central time. It will of course be understood that I do not limit myself to this particular arrangement of dials, for, if desired, the large dial may be used for indicating any one of the times indicated in the small dials. Hands are so connected to the sets of gears 41 as to move in unison with the large hands 37 and 39. Secured to the arbor 21 is a disk 43, having a toothed flange 44 upon the forward face thereof, and meshing with this flange are preferably four gears 45, arranged at equal distances from each other, and each gear is secured to a shaft 46. These shafts extend at right angles to each other, and upon the outer end of each is secured a gear 47, which meshes with a toothed flange 48, arranged upon one face of a disk 49, secured to an arbor 50. The minute-hand 51 of a clock is secured to and rotates with a spindle 53, extending from disk 49, and a sleeve 52 is revolubly mounted upon spindle 53 and has a small gear 54 thereon, which meshes with a large gear 55. A small gear 56 rotates with gear 55 and meshes with a large gear 57, loosely mounted on spindle 53 and connected to sleeve 52. One of these sets of gears is operated, as is obvious, by each shaft 46, and extending from opposite sides of each disk 49 are shafts 58, having gears at opposite ends thereof, which mesh with the teeth on flange 48 and with a similar flange arranged in rear of a gear 59. This gear is rotated by a small gear 60, which revolves with a large gear 61, adapted to receive motion from the flanged gear, (not shown,) which, as before stated, is similar to gear 49. By arranging gears in the manner herein described it is obvious that twelve sets of gears operated in unison are obtained, and each set is arranged in rear of a clock-face 62. Upon each of these clock-faces may be printed the name of some city, and the hands 51 may be so placed upon the clock-faces as to indicate the time of day at the various points.

The disk 49 of the uppermost set of gears has an upwardly-extending shaft 63, at the lower end of which is secured a gear 64, which meshes with the teeth of disk 49. To the upper end of this shaft is secured a gear 65, brackets (see Fig. 5) meshing with a toothed flange 66, arranged upon an outer face of a disk 67, and this disk is secured to an arbor 68, having oppositely-arranged beveled gears 69 and 70 thereon. An arbor 68 is adapted to be connected at its forward end to a minute-hand 71 and has a gear 72 thereon, which meshes with a large gear 73. Revoluble with this gear is a small gear 74, which meshes with a large gear 75, having a sleeve 76 integral therewith and loosely mounted on the arbor 68. An hour-hand 77 is adapted to be connected to sleeve 76. The gears upon arbor 68 and sleeve 76 are arranged in rear of a dial 78, suitably graduated to indicate the twenty-four hours of the day, and the hands 71 and 77 will, as is obvious, indicate the mean solar time.

Meshing with the beveled gears 69 and 70 are beveled gears 79 and 80, respectively arranged at the lower ends of shafts 81 and 82. To the upper end of shaft 81 is secured a gear 83, which meshes with and is adapted to rotate a gear 84, secured to a spindle 85, which is revolubly mounted between parallel horizontal arms 86 and has an earth-sphere 87 secured thereto. A sleeve 88 is revolubly mounted on spindle 85 at a point above gear 84, and to this sleeve is secured a gear 89, which meshes with and is adapted to be rotated by a smaller gear 90, arranged at the upper end of shaft 82. A curved arm 91 projects from sleeve 88 and has a moon-sphere 92 fastened to the end thereof, and an arm 93 extends upward from the outer end of the lower end 86 and has a sun-sphere 94 thereon. The earth-sphere 87 is adapted to project partly through a circular aperture 95, arranged in the front of casing 1.

The lowest disk 49 of the series encircling the central arbor 21 meshes with a gear (not shown) similar to gear 47, which is arranged at the upper end of a shaft 96. This shaft extends downward and has a gear 97 at its lower end (see dotted lines, Fig. 8) which meshes with a toothed flange 98, also shown in dotted lines in said figure and arranged upon the rear face of a gear 99. These gears are so arranged that gear 99 will rotate once every twelve hours, and it meshes with a large gear 100 twice the size thereof and which will therefore rotate once every twenty-four hours. This gear 100 has a circular disk 101 upon the outer face thereof provided with a sun-disk $101^a$, and the upper half of the gear is normally exposed in rear of a semicircular disk 102, formed within the front of casing 1 near one side thereof. A small gear 103 rotates with gear 99 and meshes with a gear 104 twice the size thereof and which is adapted to rotate once every twenty-four hours. An arm 105 extends from the periphery of gear 104 and is adapted at the completion of each revolution of said gear to contact with one of a series of seven arms 106, extending at regular intervals from the periphery of a small gear 107. It will therefore be seen that this gear 107 will rotate once every seven rotations of the gear 104, or, in other words, once every seven days. A gear 108 is interposed between gear 107 and a large gear 109, and these three gears are so proportioned that gear 109 will rotate once every one hundred and seventy-seven days, four hours, and twenty-two minutes. At regular intervals upon the outer face of gear 109 are located six disks 110, and it is obvious that every twenty-nine days, twelve hours, and forty-four minutes one of these disks will be brought into position in rear of a circular aperture 111, formed in the front face of casing 1 near one side thereof.

A disk 112 is arranged in rear of the center of casing 1 and below the gears 100 and 109, and to the arbor 113 of this disk is connected an index 114. A dial 115 is arranged about the arbor 113 and upon the front of the clock-casing, and numerals are arranged at the periphery thereof from "1" to "31" consecutively. A toothed flange 116 is arranged upon the rear face of disk 112, as shown in dotted lines, Fig. 8, and meshes with a small gear 117, secured to the end of a shaft 118. To the other end of this shaft is a small gear 119, which meshes with a toothed flange 120, extending from the rear face of gear 100. These gears 116, 117, 119, and 120 are so proportioned that thirty-one revolutions of gear 100 will revolve the arbor 113 thirty-one times.

An arm 121 projects from the periphery of gear 100 and is adapted at the completion of each revolution of said gear to contact with and move one of a series of twelve arms 122, extending at regular intervals from the periphery of a gear 123. It will therefore be obvious that this gear will rotate once during every twelve revolutions of gear 100, and gear 123 meshes with a large gear 124 and is so proportioned therewith that said gear 124 will revolve once to every thirty and five-twelfths revolutions of gear 123, or, in other words, gear 124 will rotate once during every three hundred and sixty-five revolutions of gear 100. A disk 124$^a$ is secured eccentrically on the gear 24 and forms a bearing for an arm 102$^a$, extending downward from the disk 102. As the gear 124 and disk 124$^a$ rotate once a year, the disk 102$^a$ will be raised during one half the year and lowered during the remainder of the year, thereby lengthening or shortening the period during which the sun-disk 107 moves from one end of disk 102 to the other.

An index 125 is connected to the arbor 126 of gear 124, and inclosing arbor 126 is a dial 127, upon which are arranged at suitable intervals twelve graduations, each of which is designated by the name of a month of the year, said names being arranged in their regular order from January to December. A gear 128 meshes with gear 124 and is the same size as said gear. This gear 128 is loosely mounted upon an arbor 129, and secured to this arbor is a gear 130. A small gear 131 is journaled upon the front face of gear 128 and meshes with gear 130, and it is therefore obvious that this small gear will be rotated by gear 130 when gear 128 revolves upon its arbor. An arm 132 is loosely mounted on arbor 129, and a slide 133 is arranged on arm 132 and is connected, by means of an arm 134, to a wrist-pin 135, arranged upon gear 131 at a point adjacent to the periphery thereof. An earth-sphere 136 is secured to the outer end of slide 133, and a sun-sphere 137 is fastened at the end of an angular arm 138, immovably secured to arbor 129. Sun-sphere 137 extends through an aperture formed within an ellipse 139, arranged upon the front face of the casing, and the earth-sphere 136 is adapted to travel within an oval slot 140, formed within said casing and about the sun-sphere. The oval 140 is inclosed by the signs of the zodiac, (indicated by the numeral 141 in Fig. 1.)

An arm 142 projects from the periphery of gear 128 and is adapted at the completion of each revolution to contact with one of a series of arms 143, projecting from the periphery of a disk 144. An index 145 is secured to the arbor 146 of this disk, and a dial 147 is arranged upon the front face of the casing 1 and incloses this arbor. The years are consecutively arranged by number upon the dial 147, and as gear 128 rotates once every twelve months it will be understood that hand 145 will be moved one point every year.

The ball 148 of the pendulum is hollow, and its front face is closed by a clock-dial 149, which may be used to indicate the time at any desired point upon the earth. This clock is operated by means of novel mechanism. (Illustrated in Fig. 11.) By referring to said figure it will be seen that the main arbor 150, to which the hour-hand is connected, has a sleeve 151 mounted thereon, to which is secured a ratchet-wheel 152 and a small gear 153. The ratchet-wheel is normally engaged by a pawl 154, having an arm 155 extending laterally through a slot 156 in the rear face of the ball 148. This arm 155 projects into the path of a spring-finger 157, extending downward from an arm 158, projecting from the rear wall of the casing 1. Gear 153 meshes with a large gear 159, and a small gear 160 rotates with gear 159 and serves to drive a large gear 161, arranged upon a sleeve 162, which is loosely secured to the arbor 150. A small gear 163 is also secured to the arbor and serves to rotate a gear 164, having a small gear 165 revoluble therewith. This small gear meshes with a large gear 166, having a sleeve 167 projecting therefrom and loosely mounted on the arbor 150. The hour-hand of the clock is adapted to be secured to this sleeve.

To wind the apparatus herein described, it is merely necessary to rotate spindles 8 by means of suitable keys, so as to wind the strips 10 upon their respective drums 9. During this winding operation the ratchets 14 will slip under the pawls 15; but as soon as the stems 8 are released the ratchets will bear upon the pawls, and the weights 11 will cause the drums 9 to slowly revolve, and thus impart reciprocating motion through the various gears to the central arbor 21 and the spindle 36 therein. The escapement-wheel 28 will also be rotated, as is obvious, and an oscillating movement will be imparted to the pendulum 32 and the ball 148 at the end thereof. By means of these gears the hour-hand 39 will rotate upon dial 38 once every twelve hours, and the minute-hand 37 will rotate thereon once every hour. By means of the shafts 46 and 58 motion will be imparted from the central gears to the sets of gears arranged in rear of dials 62, and the hour-hands of these dials will move in unison with the hand 39, and the minute-hands will move in unison with the hand 37. The hands of the dials arranged within the large central dial 38 are also rotated simultaneously with the hands 37 and 39. It will of course be understood, however, that the hands of the different dials are set so that the time at the different places indicated upon the respective dials will be accurately designated thereby. The hands 71 and 77 are moved in unison with the hands 37 and 39 by the shaft 63 and the gears driving the same and driven thereby. As before stated, these hands will indicate the mean solar time. The shafts 81 and 82 will be revolved in opposite directions by gears 69 and 77, and shaft 81 revolves the gear 84 and the earth-sphere 87 in one direction, while the shaft 82 serves to rotate the other gear, 89, and the moon-sphere in an opposite direction. These parts are so turned that the earth-sphere 87 will rotate once every twenty-four hours, and the moon-sphere will be carried therearound at the proper speed in relation thereto. As hereinbefore described, motion is transmitted from the mechanism of the lowest clock-face 62 to gear 99, which rotates gear 100 once every twenty-four hours and gear 107 once every seven days. It will therefore be obvious that the disk 101 upon gear 100 will rise above the lower edge of the semicircular aperture 102 at the end thereof marked "E" (east) and twelve hours thereafter will pass below said edge at the other end, marked "W," (west.) Each time the gear 107 is moved one point the hand 107ᵃ, connected thereto, will move to the next day indicated upon the dial of said hand, and the gears 107, 108, and 109 are so related and proportioned that one of the disks 110 thereon will appear within aperture 111 every twenty-nine days eleven hours and forty-four minutes, thereby disclosing the phases of the moon at the proper periods. As hereinbefore stated, gear 124 will be rotated once every year, and hand 125 will automatically indicate the month of the year. The day of the year is indicated by the hand 114, which, as before stated, rotates once to every thirty-one revolutions of the gear 100 and is used for indicating the day of the month. Hand 145 indicates the year, and the sphere 136 rotates about the sun-sphere 137 once every year, and the position of the earth-sphere in its orbit is accurately indicated in this manner. It is thought that the operation of the clock arranged within the ball of the pendulum will be thoroughly understood from the description hereinbefore given. As the pendulum oscillates from side to side the arm 155 is brought into contact with spring-finger 157 and is tripped thereby, causing pawl 154 to impart a partial rotation of ratchet 152. The gears arranged within the ball 148 are so proportioned that one rotation of ratchet-wheel 152 is made every sixty minutes, and the sleeve 167 and the hour-hand connected thereto is rotated upon the clock-face once every twelve hours.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

1. In a clock, the combination with a casing having an oval slot therein; of a stationary arbor within and adjacent to one end of the oval, a gear loosely mounted upon the arbor, a gear fixed upon the arbor, an arm loosely mounted upon the arbor and secured to the revoluble gear, a gear journaled upon the arm and meshing with the fixed gear, a slide upon the arm, a pitman connecting said slide and the gear on the arm, and an earth-sphere extending from the slide and adapted to travel within the slot in the casing.

2. In a clock, the combination with a casing having an oval slot therein; of a stationary arbor within and adjacent to one end of the oval, a gear loosely mounted upon the arbor, a gear fixed upon the arbor, an arm loosely mounted upon the arbor and secured to the revoluble gear, a gear journaled upon the arm and meshing with the fixed gear, a slide upon the arm, a pitman connecting said slide and the gear on the arm, an earth-sphere extending from the slide and adapted to travel within the slot in the casing, a disk journaled within the casing adjacent to the revoluble gear, tongues extending from the periphery of said disk, a tongue extending from the gear and adapted to successively engage the tongues of the disk, and a year-indicating hand connected to the disk and revoluble therewith.

3. In a clock, the combination with a central arbor, and means for rotating the same; of a stationary arbor, a gear loosely mounted thereon, a stationary sun-sphere connected to the stationary arbor, an earth-sphere mounted upon and adapted to move around the central arbor, means for moving the earth-sphere in an oval about the sun-sphere, and gears for transmitting motion from the central arbor to the earth-sphere.

4. In a clock, the combination with a central arbor, and means for rotating the same; of a stationary arbor, a gear loosely mounted thereon, a stationary sun-sphere connected to the stationary arbor, an earth-sphere mounted upon and adapted to move around the central arbor, means for moving the earth-sphere in an oval about the sun-sphere, arbors revolubly mounted within the casing, a year-indicating hand connected to one of the arbors, a month-indicating hand connected to the second arbor, a hand for indicating the day of the month connected to another arbor, and a train of gears operated by the central arbor for transmitting motion to the rotary arbors and to the arm of the earth-sphere.

5. In a clock, the combination with a main arbor, drums at opposite sides thereof, and means for rotating the drums; of arbors removed from and arranged at intervals around the main arbor, hands connected thereto, means for transmitting rotary motion from the main to the surrounding arbors, a central gear 128, means for transmitting motion thereto from the first-mentioned arbor, a stationary arbor forming a bearing for said gear, a stationary sun-sphere connected to the stationary arbor, an earth-sphere mounted upon and adapted to move with the central gear, and means for moving the earth-sphere in an oval about the sun-sphere.

In testimony whereof I affix my signature in presence of two witnesses.

JOHN C. BURKE.

Witnesses:
 ALVA H. CAMPBELL,
 W. H. GIBSON.